United States Patent [19]
LaBarbera et al.

[11] Patent Number: 5,757,897
[45] Date of Patent: May 26, 1998

[54] TELEPHONE SWITCH CALL CONTROL UNIT

[75] Inventors: Ross J. LaBarbera, Plano; Barry W. Barge, Richardson, both of Tex.

[73] Assignee: Digital Techniques, Inc., Allen, Tex.

[21] Appl. No.: 350,907

[22] Filed: Dec. 7, 1994

[51] Int. Cl.$^6$ .................................................. H04M 1/00
[52] U.S. Cl. .................. 379/165; 379/112; 379/156; 379/274
[58] Field of Search .................. 379/67, 70, 88, 379/89, 111, 112, 113, 114, 116, 119, 133, 134, 135, 136, 156, 157, 162, 163, 164, 165, 166, 210, 211, 212, 214, 265, 266, 274, 308, 309

[56] References Cited

U.S. PATENT DOCUMENTS

| | | | |
|---|---|---|---|
| 4,408,100 | 10/1983 | Pritz et al. | 379/265 |
| 4,451,705 | 5/1984 | Burke et al. | 379/265 |
| 4,484,031 | 11/1984 | Gray et al. | 379/212 |
| 4,694,483 | 9/1987 | Cheung | 379/112 X |
| 4,763,353 | 8/1988 | Canale et al. | 379/157 |
| 4,873,718 | 10/1989 | Barnett et al. | 379/156 |
| 5,036,535 | 7/1991 | Gechter et al. | 379/210 |
| 5,062,103 | 10/1991 | Davidson | 379/265 X |
| 5,230,017 | 7/1993 | Alexander | 379/113 X |
| 5,299,260 | 3/1994 | Shaio | 379/265 |
| 5,317,630 | 5/1994 | Feinberg et al. | 379/210 X |
| 5,425,087 | 6/1995 | Gerber et al. | 379/113 X |
| 5,432,846 | 7/1995 | Norio | 379/266 |
| 5,471,523 | 11/1995 | Smith et al. | 379/165 |

*Primary Examiner*—Krista Zele
*Assistant Examiner*—Scott L. Weaver
*Attorney, Agent, or Firm*—Fulbright & Jaworski L.L.P.

[57] ABSTRACT

There is disclosed an apparatus for providing automatic call distribution and auto-attendant capabilities to a digital telephone switch not having those capabilities. Digital interface circuitry is provided to emulate the appearance of a digital telephone connected to the telephone switch. The telephone switch is programmed to automatically route incoming calls to the interface circuitry and also to transmit the status of other digital telephones connected to the telephone switch to the interface circuitry. A processor is provided which determines the busy/idle state of other telephones connected to the switch, and transmits to the telephone switch a transfer command which re-routes the incoming telephone call to an idle telephone. Storage circuitry is provided for storing a user-defined algorithm for distributing incoming calls to the available digital telephones. Storage circuitry is also provided for storing digital audio messages for replay to the incoming calls when the incoming calls are placed on hold by the processor means.

37 Claims, 5 Drawing Sheets

TYPICAL PCM/COMPRESSED
I/O OPERATION

TELEPHONE SWITCH CALL CONTROL UNIT

TECHNICAL FIELD OF THE INVENTION

This invention relates to telephone switch devices and more particularly to a system and method for providing automatic call distribution and auto-attendant capabilities to a digital telephone switch.

BACKGROUND OF THE INVENTION

There are numerous telephone equipment suppliers that provide businesses with proprietary phone systems, such as PBX's, that are capable of interfacing a large number of agents/operators with phone lines from the central office of the local public phone system. Some of these companies, such as Northern Telecom, design key service units that do not include certain well known automated features as part of the base line platform of the key service unit, but do allow for easy expansion/upgrading of the key service units with third party vendor equipment. For example, Northern Telecom's Norstar key service unit, unlike typical PBX systems, does not feature automatic call distribution (ACD) capability or auto-attendant capability as an integral function in the system. Nonetheless, the Norstar key service unit can be easily coupled, by means of an RS232 port, to third party equipment that provides ACD and auto-attendant capability.

While a key service unit (KSU) becomes more affordable by reducing the complexity of the basic unit, the cost of upgrading the KSU's capability is frequently prohibitive. Third party vendor equipment using the RS232 port to provide augmented capability may cost twice what the KSU itself might have cost.

The conversion is made even more expensive because the personnel who install KSUs are frequently unfamiliar with and unqualified to install the third party upgrade equipment. This requires the hiring of additional personnel.

There is therefore a need for low-cost KSU upgrade equipment that can provide automatic call distribution and auto-attendant capabilities to key service units that lack these features.

There is a further need for KSU upgrade equipment that may be easily installed by telephone system technicians without the need for specialized training.

There is a still further need for low-cost KSU upgrade equipment that is capable of gathering statistical data regarding the calls among agents coupled to the KSU and displaying the performance results.

SUMMARY OF THE INVENTION

The present invention is a call control unit which solves the foregoing problems inherent in the prior art systems and provides basic ACD and auto-attendant capabilities by emulating the appearance of a 24 button 7324 telephone set to the key service unit. The basic function of the call control unit is to answer incoming calls on external and/or internal line appearances and to distribute them according to a user selected algorithm. In addition to this, the present invention has the capability to record and play back digitized voice messages, such as prompts or call held reminders, to incoming calls on hold.

In one embodiment, the call control unit (CCU) appears to the Norstar KSU as a "virtual" 7324 set, with a line appearance for each external line as well as an intercom key for each internal line that is to be handled. In addition, the CCU has a Direct Station Select (DSS) (internal autodial) appearance for each agent that is to receive incoming calls. One key is assigned as a Log In Line and one key as a Log Out Line. Additionally, one key of the CCU is assigned as the Configuration Line and is used to answer calls from other Norstar stations as part of the configuration or message recording process.

The KSU is programmed, via another Norstar telephone, to transmit line appearance data to the digital port to which the call control unit (CCU) is connected. The line appearance data comprises the lamp indicator status and other data of each of the telephone lines connected to the KSU. By emulating a 7324 telephone set, the call control unit may be programmed to receive the line appearance data for all other telephones and intercoms connected to the KSU.

When an incoming call is received by the KSU, it is switched to the CCU, which will determine from the lamp indicator status of the agents digital telephone sets connected to the KSU which agents are busy and which agents are idle. After answering the incoming call, the CCU will transfer (or forward) the call to an appropriate agent's telephone connected to the key service unit. Thereafter, whenever an operator hangs up one of the telephones coupled to the KSU, the change in status will prompt the KSU to update the line appearance data to the CCU, thereby keeping the line appearance status in the CCU current with the actual status of each telephone connected to KSU.

If the CCU determines from the status of its line appearances that all of its agents phones connected to the KSU are in use, the CCU will send a "virtual" hold signal. At that point, rather than transferring subsequent incoming calls to an agent, the system plays pre-recorded voice messages to the caller while on hold. When an agent at a KSU hangs up, the KSU will inform the CCU that a telephone line is available, and the CCU will transfer one of the held calls stored in a "hold" queue to the idle telephone.

The CCU hardware consists of a wall-mountable unit measuring approximately 12" by 10" by 4". In this expandable design, optional ports are added to handle more lines, or to reduce call answer times. The CCU has an external, AC to DC power supply with internal regulation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
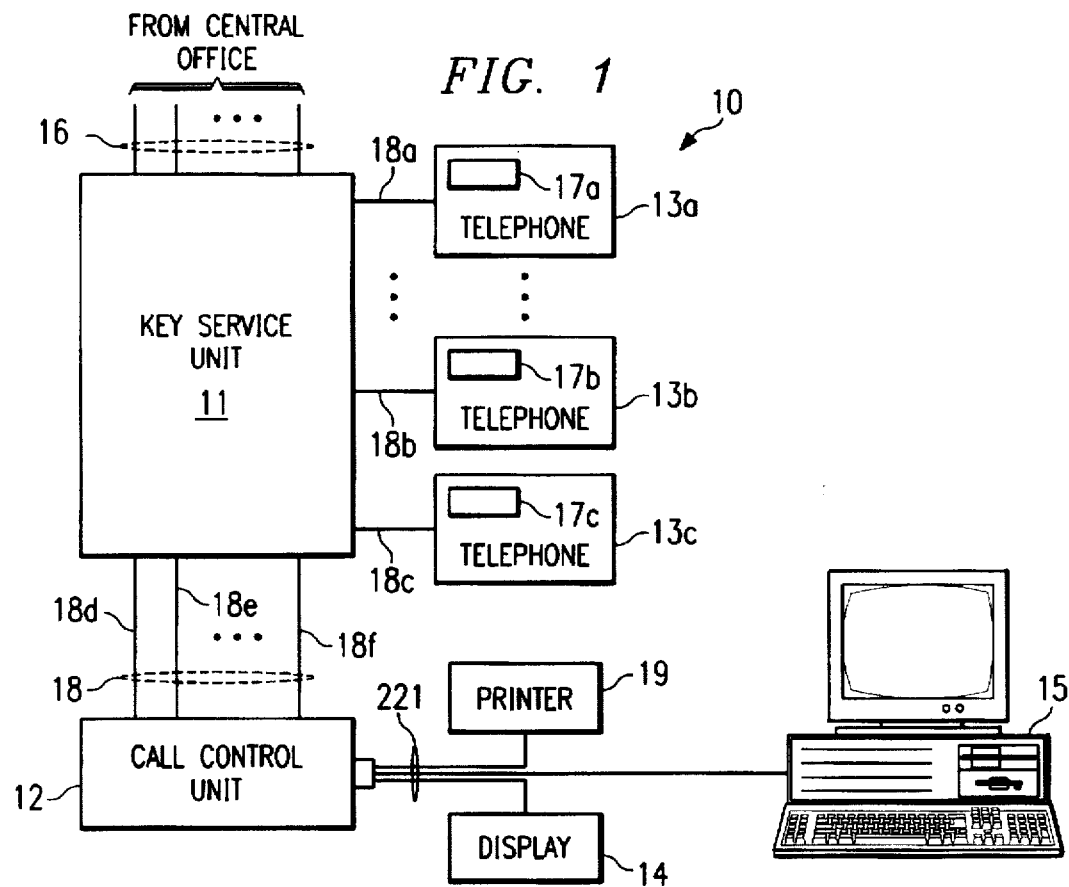
FIG. 1 is a block diagram of a digital telephone key service system.

FIG. 1 shows a telephone key system 10 containing a key service unit (KSU) 11, which in a preferred embodiment of the present invention is a Northern Telecom Norstar key system, the specifications and operating characteristics of which are hereby incorporated by reference. KSU 11 provides the switching capability for telephones 13a–13c. The present invention, shown in FIG. 1 as call control unit 12 (CCU 12), provides automatic call distribution (ACD) capability and/or auto-attendant capability to the different sized versions and software releases of the Norstar KSU 11.

In a telephone key system not equipped with the present invention (CCU 12), an incoming call is received from a central office phone line by KSU 11, which typically then rings all of the telephones 13a–c. This causes the indicator lamps of all telephone sets to flash, and all telephones ring until one is answered. The Norstar KSU (and many other key service units) are compatible with a variety of telephone sets, including 10 button 7310 sets and 24 button 7324 sets. If there was nobody available, the call would go unanswered and the caller would either hang up or be switched to a voice mail system if that feature or system were available and installed in KSU 11.

Figure 6:
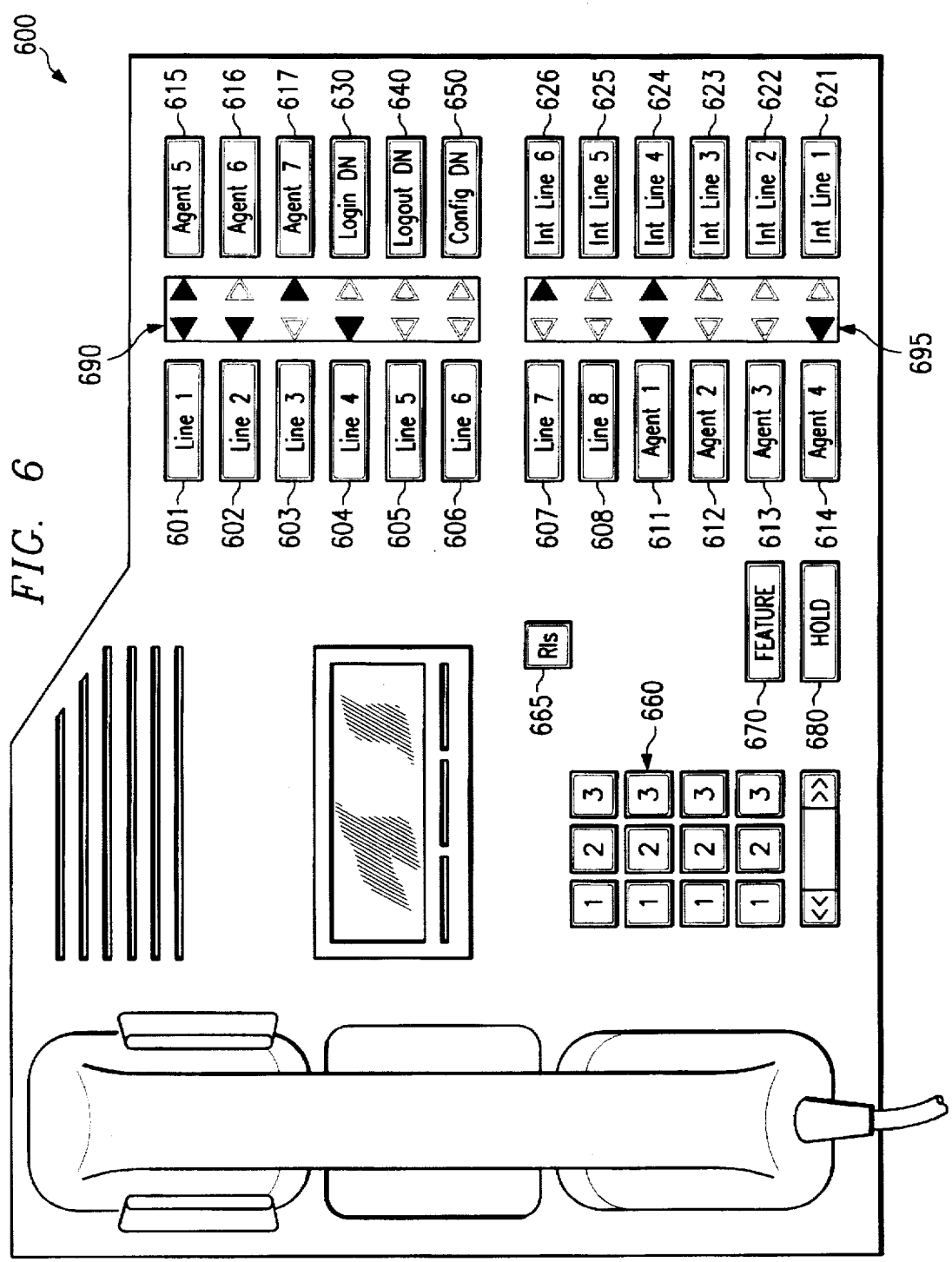
FIG. 6 is a diagram of a typical 7324 telephone set which the present invention emulates.

FIG. 6 depicts a typical twenty-four button 7324 telephone set which the call control unit 12 of the present invention emulates in a preferred embodiment of the present invention. Telephone 600 contains twenty-four indicator lamps in two LED sets 690 and 695 to indicate the status of the other telephone lines/agents connected to KSU 11. Line appearance data sent to the telephone 600 shown in FIG. 6 by KSU 11 causes the appropriate indicator light to turn on whenever the telephone/agent/intercom line connected to KSU 11 is in use. Telephone 600 has a HOLD button 680, a release button 665, and a FEATURE button 670. In this example, buttons 601–608 are the external line appearances of Lines 1–8 of the 7324 telephone. Buttons 621–626 are the internal appearances (intercoms) associated with the 7324 telephone set. Finally, buttons 611–617 are are line appearances for the agents associated with call control unit 12.

Call control unit 12 continuously monitors each of the external and internal line appearances for a ring indication from the KSU. When this occurs, CCU 12 emulates the pressing of the key associated with that line to answer the incoming call and plays a greeting message, if so configured. If an agent is available, CCU 12 routes the call by emulating the pressing of the Direct Station Select (DSS) key associated with that agent.

If no agent is currently available, a user recorded message can be played to the incoming call (all messages may be enabled/disabled by the user) and the call is then put on hold. Alternating refresher messages may be periodically played to the caller to encourage them to stay on the line until the next agent is available. In addition, a message can be played at appropriate intervals, usually once upon entry into the queue and at the end of each refresher message, telling the caller what number he or she is in the queue. As an additional feature, users that know the extension they wish to reach, may dial the extension via dual tone multiple frequency (DTMF) keypad during any message playback from CCU 12. This feature must be enabled via configuration programming before it is available.

Agents "log in" and "log out" of CCU 12 via either the Do Not Disturb feature of the Norstar KSU 11 or via dialing the extension associated with the Log In or Log Out lines of CCU 12. The Do Not Disturb feature may be invoked either via a programmed button with this feature, or via the feature key sequence "Feature 85". CCU 12 can distinguish between an agent being off-hook and an agent not being "logged in" at all and can therefore determine the availability of agents.

Before CCU 12 can operate properly, it must be configured with data showing the number of external lines, the number of intercoms, the number of agents, the agent extensions, the log in/log out extensions, and the type of call distribution required. Also, customized messages must be recorded via another Norstar phone. An administrator dials the extension associated with the Configuration Line on CCU 12 (button 650 in FIG. 6), which answers and prompts the administrator for a password. CCU 12 then leads the administrator (via voice prompts) through various menus for registering the number of lines, agents and agent extensions, etc. and also records the customized messages.

Note that the port associated with CCU 12 must be previously set up with all necessary line appearances. This is done through normal Norstar setup procedures. The DSS appearances are automatically programmed by CCU 12 when the agent extensions are entered. In a preferred embodiment of the present invention, CCU 12 provides flexibility in combining different numbers of external lines, internal lines and assigned agents.

Note that the end user must trade off the number of lines and agents in such a way that the total number of lines (external+internal) plus the number of agents is 21 or less, since only 21 keys are available for these appearances (the remaining three are required for log In/Log Out and Configuration). The following are a few examples of valid combinations:

| External Lines | Internal Lines | Agents | Total |
|---|---|---|---|
| 10 | 1 | 9 | 20 |
| 6 | 6 | 9 | 21 |
| 0 | 8 | 5 | 13 |
| 8 | 8 | 5 | 21 |
| 5 | 5 | 7 | 17 |

Hardware Description

Figure 2:
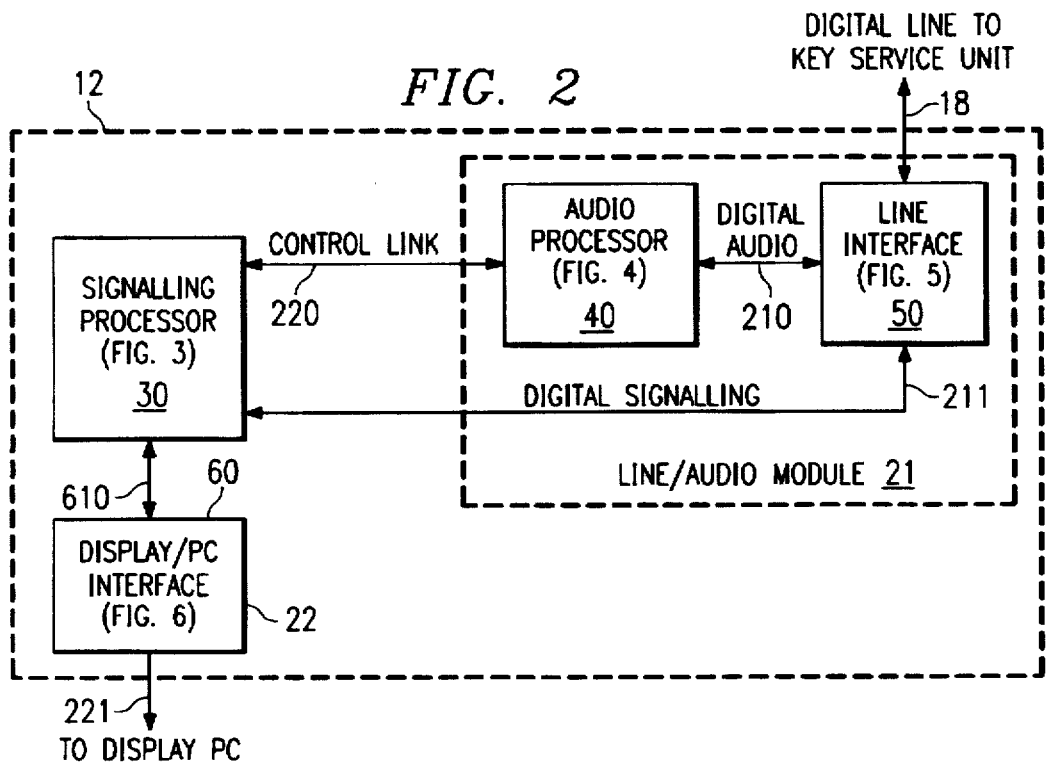
FIG. 2 is a block diagram of the functional modules embodying the present invention.

FIG. 2 shows a block diagram of the basic hardware components of CCU 12. CCU 12 contains a motherboard and optional expansion cards, which are contained in signalling processor 30. Signalling processor 30 also contains a call processing microprocessor and support circuitry, a clock generator, and a power supply. In addition, the motherboard contains a single port Norstar digital line interface 50 and audio playback/record circuitry (audio processor 40)

which CCU 12 uses for prompting end users. Additional ports (up to a total of 4) can be added via the expansion cards. Data is sent through serial port 221 to wall display 14 and PC 15 via the Display/PC interface 22. The line interface/audio expansion module 21 contains all of the necessary circuitry to interface to an additional KSU 11 port. Additionally, one expansion slot of CCU 12 is reserved for a disk drive interface card used in applications which require storage of large amounts of voice data.

Figure 3:
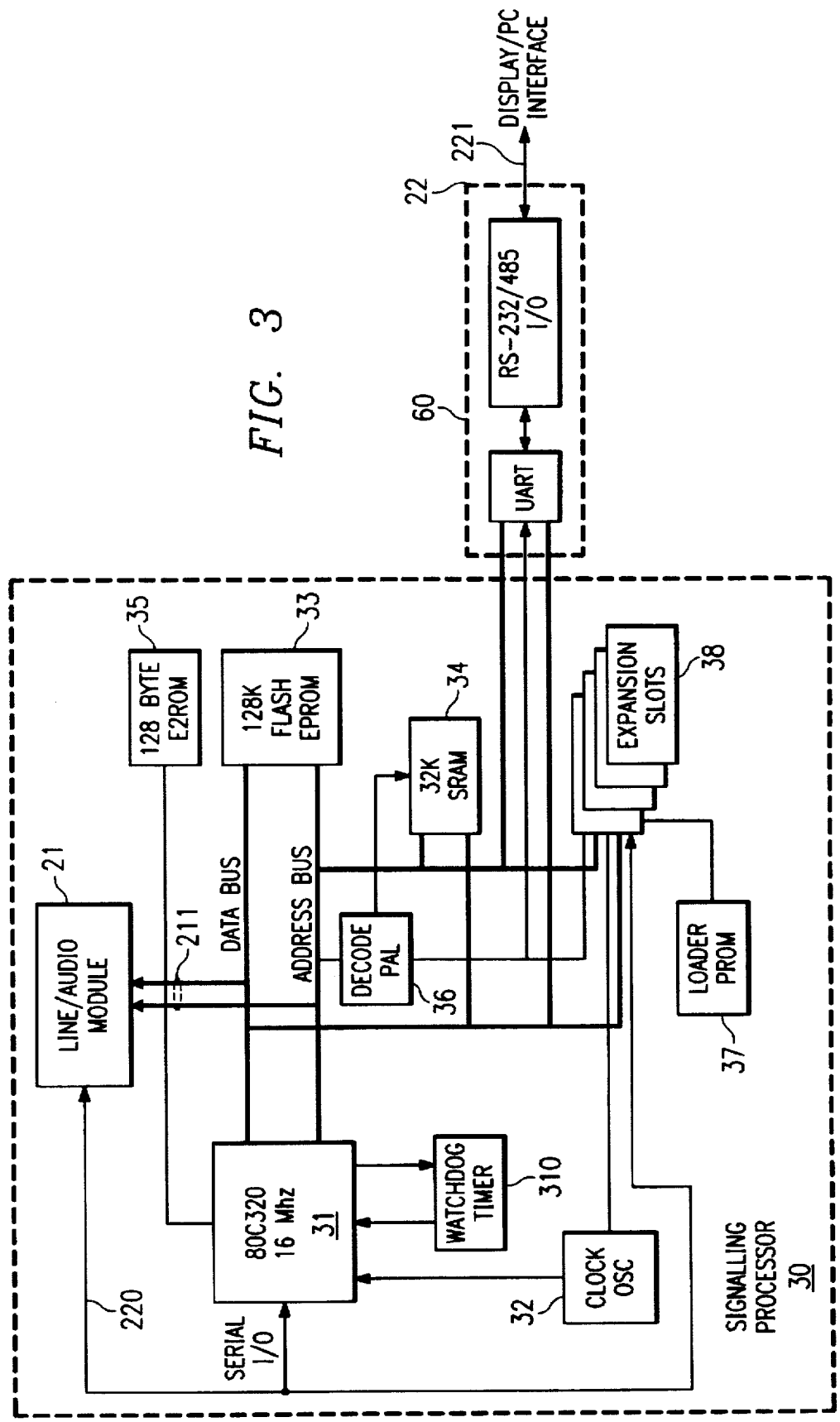
FIG. 3 is a schematic diagram of the signalling processor module of the present invention.

FIG. 3 shows the core of signalling processor 30, which consists of a 16 Mhz 80C320 microprocessor 31, 128K of flash EPROM 33, 32K of static RAM 34, and 128 bytes of EEROM 35. Address decoding is done via a programmable PAL decoder 26. A watchdog timer/power monitor 310 is used to keep microprocessor 31 operating properly. Oscillator 32 drives microprocessor 31. In a preferred embodiment of the present invention, static RAM 34 is made non-volatile by the use of a DS1210 non-volatile memory controller. This may be bypassed and the DS1210 removed if non-volatility is not desired in a particular configuration.

External serial port 221, typically a Signetics 2691, is brought out to a DB-9 connector on the rear panel for use as a debug port or to drive external wall display 14. Display/PC interface 22 uses a UART to receive data from microprocessor 31 and sends the data to PC 15 or wall display 14 through either RS-232 or RS-485 drivers and receivers, both of which are provided. The user may select either by using jumpers. The internal serial port 220 of microprocessor 31 is used to communicate with audio interface processor 40.

Oscillator 32 is used to drive microprocessor 31 at 16.384 Mhz, as well as being provided to the Line Interface/Audio cards. A second oscillator, 12.352 Mhz, is also provided to the Line Interface/Audio cards for their voice compression circuitry.

The motherboard also contains loader PROM 37 for downloading data arrays present on the interface cards in expansion slots 38. To provide for software downloading of the arrays, loader PROM 37 may be removed, and microprocessor 31 used to download the arrays. (NOTE: It is assumed that expansion port arrays load in parallel, i.e., use the same load.)

For normal CCU 12 operation, only +5.00 VDC is required. An external AC to DC power supply provides 9.0V, which is then dropped to +5 V via a three terminal regulator. The power dissipation of the single port version of the present invention is about 4 Watts.

The motherboard provides four interface/expansion slots 38 to provide access to the line interfaces of KSU 11 and their corresponding audio circuits. In a preferred embodiment of the present invention, three slots are used for port expansion, and an available slot for future enhancements of data storage on disc. The slots have edge card connectors and provide data, address, and control lines, as well as power and clocking. The four expansion slots 38 are connected to the address and data bus of microprocessor 31.

Figure 5:
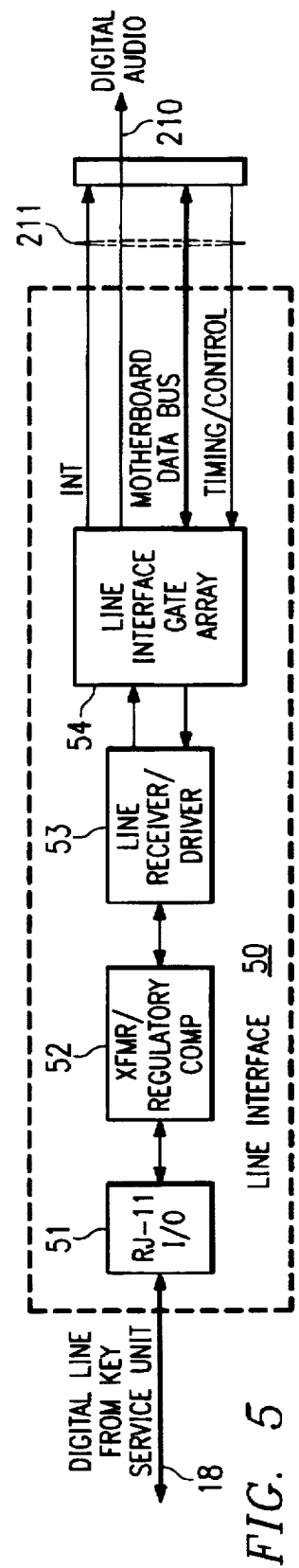
FIG. 5 is a block diagram of the line interface module of the present invention.

FIG. 5 shows digital line interface 50, which consists of an RJ-11 connector 51, transformer/regulatory protection components 52, line receiver/driver 53, and line interface gate array 54. In a preferred embodiment of the present invention, gate array 54 is a Xilinx 3042 based line interface gate array. Gate array 54 frames up on the incoming data from KSU 11 on line 18, then recovers PCM clock, frame and data for use by the audio compression circuitry. Gate array 54 also captures signaling information from the switch and provides it to the motherboard processor on data path 211 in a parallel, 8-bit data bus format. Interrupts are generated to indicate signaling data ready for processing. In the transmit direction, the gate array 54 inserts PCM into the outgoing ping-pong type data stream for the switch. Digital signaling data is sent to KSU 11 via 8-bit blocks written by microprocessor 31. The outgoing data is AMI/RZ coded and transmitted by the line transformer.

Figure 4:
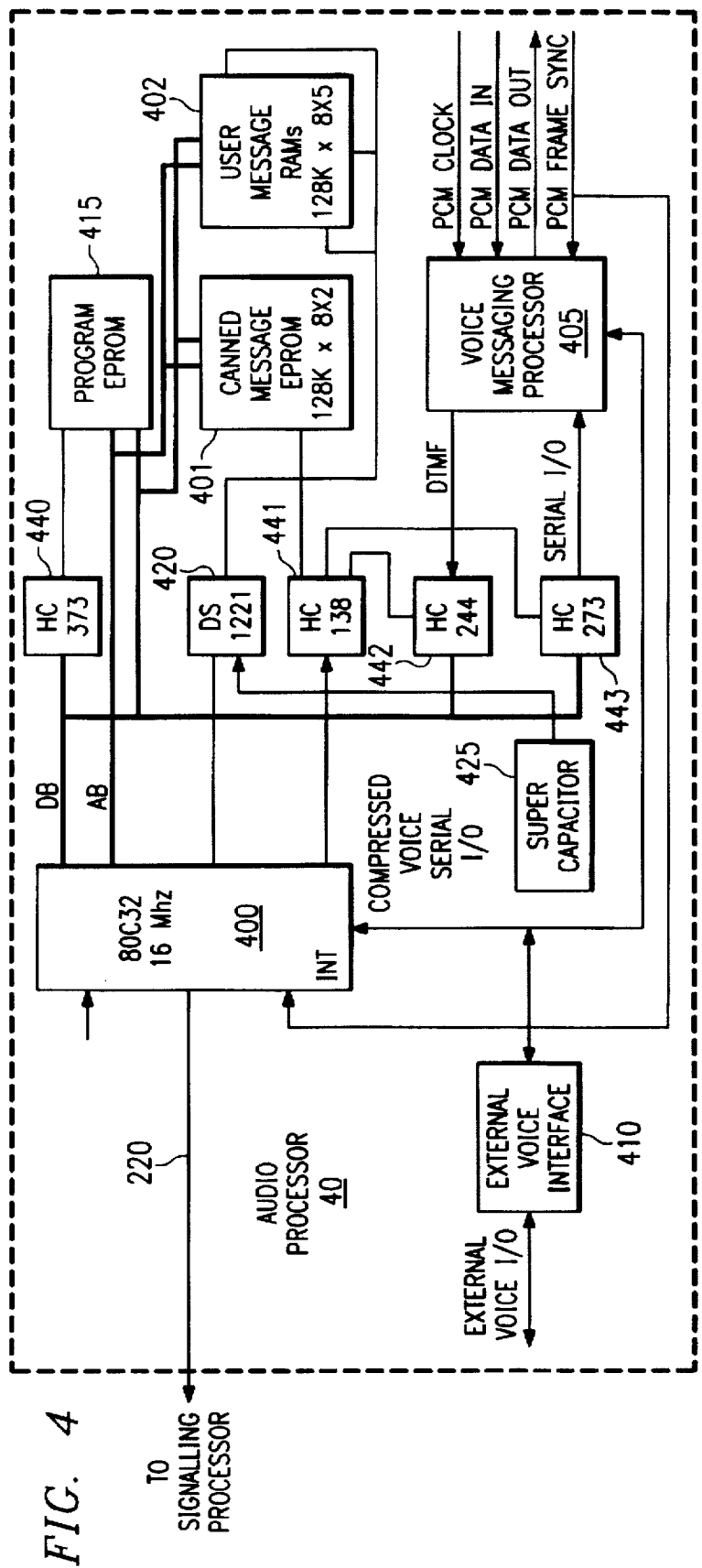
FIG. 4 is a schematic diagram of the audio processor and voice messaging processor of the present invention.

FIG. 4 shows audio processor interface 40, which contains circuitry to compress/expand audio coming or going from the line interface, and store or retrieve it from memory. This is done via high level commands sent from the microprocessor 31.

The audio interface 40 consists of a Voice Messaging Processor (VMP) 405, typically a DS2130Q, an 80C32 microprocessor 400 with up to 64K of EPROM program memory 415, two 128K×8 EPROM 401 for canned message storage and five 128K×8 SRAMS used to store recorded messages from the end user. To keep these messages from being lost during brief power outages, a non-volatile memory controller 420 (DS1221) and a large capacitor 425 (1 Farad) is used. This is designed to provide 3 days of message loss protection.

The internal serial port of microprocessor 400 is used to communicate with line interface microprocessor 31. Microprocessor 31 tracks all call processing and issues commands through this port on line 220 to enable recording and playback of messages, as well as tone detection and generation messages.

VMP 405 is programmed for proper operation by microprocessor 400 via a 3-line serial interface. In addition, microprocessor 400 is responsible for shifting compressed audio into and out of VMP 405 and storing or retrieving voice data from the proper memory array. This is done via the processors I/O port pins.

The line/audio interface expansion cards 38 consist of exactly the same circuitry present on audio interface 40 and line interface 50. The expansion cards have a 22 pair card edge for mating to the motherboard's expansion connectors. A rear panel RJ-11 is provided for connection to the digital line 18.

System Operation

As shown in FIG. 5, incoming signaling bits from KSU 11 are buffered up to 8 bits by the line interface gate array 54 and then an interrupt is generated. Microprocessor 31 then reads the signalling bits to determine if a signalling message is present. If it is, the message is read over the required number of frames until a complete message is built. Under the Norstar KSU protocol, this is done by monitoring the Signaling and Signaling Valid bits in the incoming stream. When no signaling is present, the Signaling bit idles at a logic 1 and the Valid bit is a zero. To start a message, the Signaling bit goes low and the Valid bit goes high. For the duration of the message, the Signaling bit then contains the message at one bit per frame as long as the Valid bit remains high. When the Valid bit transitions low, the message is completed and may be processed.

Once a message is completed, CCU 12 program's main loop then calls the incoming message processing routine, which in turn, breaks down the message into one of several categories and calls the appropriate processing routine. Incoming messages fall into one of two categories: stimulus and functional. Most of the messages actually used are stimulus and are further broken down into single-byte, two-byte or multi-byte messages.

After CCU 12 powers up, it begins to respond to reset messages from KSU 11. KSU 11 then recognizes that CCU 12 is present and queries it for its type of set. CCU 12 responds as an expanded set, which the switch recognizes as a 7324 type set. From that point forward, CCU 12 will respond to sanity queries sent periodically by KSU 11, and hence will remain in an "in-service" condition.

On the transmit side, CCU 12 must send a "Request to Send" message via the line interface gate array 54. When KSU 11 responds with a "Clear To Send" message, CCU 12 may begin sending a message to the switch, one byte at a time. Gate array 54 contains 8-bit registers for both the outgoing signaling and signaling valid bits, which are then sent out one pair per frame.

Audio Interface

Voice Messaging Processor 405 (VMP) shown in FIG. 4 is under control of microprocessor 400, which programs VMP 405 for proper operation via a 3-wire serial interface. This programming information includes playback/record mode, compression/expansion bit rate, loop back, and A- or u-law PCM format. This must be done prior to each record or playback session. (Note that VMP 405 is inherently a half-duplex device, and can only record or play, but not do both simultaneously). In addition, VMP 405 generates DTMF or one of three single tones via this serial interface. VMP 405 is also time slot assignable, on both the PCM (switch) side and the compressed audio side. The time slots are programmed via the serial interface.

Figure 7:
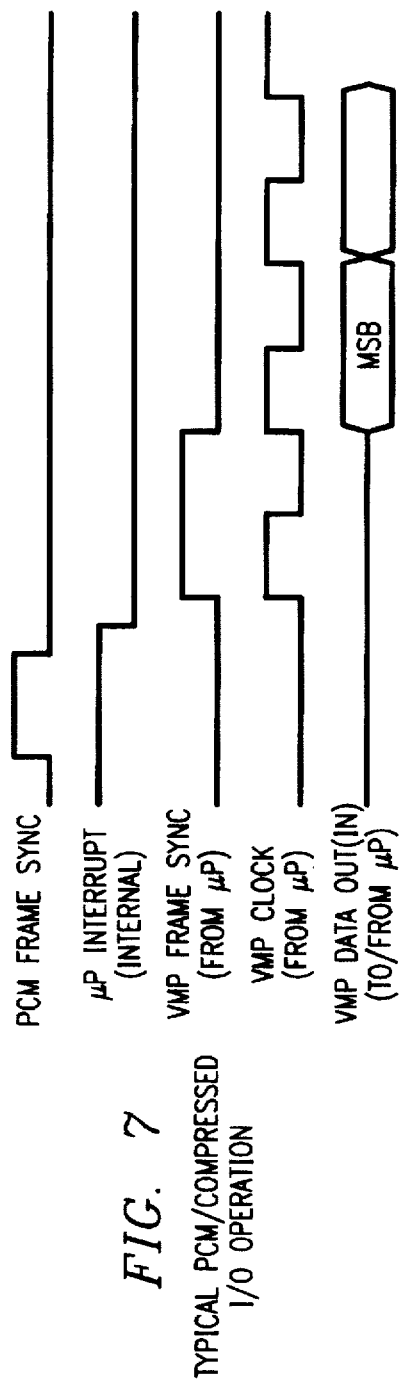
FIG. 7 is a timing diagram of a PCM/compressed audio I/O data transfer.

Microprocessor 400 in FIG. 4 receives a START RECORD command from microprocessor 31 to begin record operation. Microprocessor 400 then initializes VMP 405 for proper record operation. Microprocessor 400 generates an interrupt with the occurrence of Frame Sync from the line interface (see the timing diagram in FIG. 7). Microprocessor 400 then generates the Frame Sync and Clock signals to VMP 405. VMP 405 compresses the incoming PCM audio, which microprocessor 400 reads one bit at a time under control of the clock it sends to VMP 405. Microprocessor 400 accumulates 8 bits of compressed audio and stores it at the next available RAM location. Note that this will take from 2 to 4 frames depending on the compression rate selected.

The data is formatted in memory in such a way that it is compatible with that specified by Dallas Semiconductor for its Speech Stik product. In this way, canned messages may be recorded via the Speech Stik Design Kit and its output can be used to program an EPROM that can be used directly for CCU 12 canned messages. This format includes a header byte to indicate the message number being recorded or played. In this way, up to 254 separate messages maybe stored.

Normally, microprocessor 31 sends a STOP RECORD message to microprocessor 400 via its serial port 220 to terminate the process when the user hits a keypad key to terminate recording.

Microprocessor 400 receives a PLAYBACK START message from microprocessor 31 indicating which message to play. Microprocessor 400 finds the start of the message in its memory array, retrieves the data one byte at a time, converts it to the proper number of bits per frame for the playback rate, and sends it out one bit at a time to VMP 405, in the same manner recording data was described earlier. This involves sending frame sync and clock pulses to VMP 405 along with the data bits. This process continues until microprocessor 400 reads a header byte indicating the start of another message. Microprocessor 31 may terminate a playback at anytime by sending a PLAYBACK STOP message.

VMP 405 contains the circuitry needed to detect or generate DTMF tones. Microprocessor 31 enables reporting of these tones with a TONE REPORT message with the enable bit set. When this is sent, microprocessor 400 may autonomously report detected DTMF tones to the microprocessor 31. This mode is terminated via a TONE REPORT message with the enable bit cleared. Microprocessor 31 also polls audio microprocessor 400 for tone presence via a TONE READ command. This reports not only detected tone (if present) but report the incoming audio level if no tone is present.

Microprocessor 31 also causes VMP 405 to send DTMF or single tones via a TONE SEND command with the enable bit set. The command also contains a duration for the tone.

Several test modes are supported by audio microprocessor 400. The LOOP DTMF command is used to loop the DTMF transmitter back to its receiver. This command also loops PCM data. Sending the command with the enable bit cleared terminates the looping. The SELF TEST message causes audio microprocessor 400 to perform its internal diagnostic tests. The REPORT TEST message from microprocessor 31 causes it to send its test results. The REPORT STATUS message causes audio microprocessor 400 to send its current status—playback, record, idle, test—to microprocessor 31.

The PCM format used is selected via the CODING SELECT command. With the enable bit set, the coding is u-law (the power on default). If the enable bit is cleared, A-law coding is selected.

The time slot for VMP 405 to use on the compressed audio side of the device is assigned via the TIME SLOT command. This is only intended to be used when the audio is under the control of external hardware on a Time Division Multiplexed bus. The external audio control is enabled with the EXTERNAL AUDIO command with the enable bit set, and disabled with the same command with the enable bit cleared. (Note: for tone detection and generation. VMP 405 must be supplied with a clock. Typically, the external clock is activated for this purpose, except when messages are being played or recorded).

CCU 12 supports two different call distribution techniques. The first of these is the Longest Idle. This method transfers an incoming call to the agent who has been idle the longest. The second method is Preferred Agent. This transfers calls according to a user-defined table of preferences. This is useful if the end user has backup agents who only handle calls as needed.

CCU 12 monitors each of its assigned line appearances (both external and intercom) for an ALERTING INDICATOR message from KSU 11 for the LCD indicator associated with each line. This is interpreted as an incoming call. CCU 12 then emulates the pressing of the "virtual" line appearance button associated with that call by sending the appropriate key press. CCU 12 then follows the appropriate algorithm to determine which agent will get the call. Optionally, CCU 12 plays the pre-recorded Welcome Message at this time. It then transfers the call by sending a FEATURE 70 key sequence, then the Direct Station Select (DSS) key associated with that agent. To complete the transfer, the release key is pressed. This is necessary for DR5 Transfer without Announcement and therefore must be included so that CCU 12 works properly with all types of loads.

In order to perform the Longest Idle method of distribution, a timer is maintained for every agent. The timers have a resolution of 1 second, and a maximum value of about 18 hours.

If the Preferred Agent method is in effect, CCU 12 routes the call to the first available agent with the lowest assigned Agent Type. This is done via a table set up during configuration programming.

In either case, the busy status of agents is monitored via the Busy Status Indicator (BSI), which is the LCD indicator associated with each DSS button. Agents may log in/log out by using a Do Not Disturb button on their phone or its equivalent, FEATURE 85. This causes the BSI associated with that agent to go "ON" or "OFF" as appropriate. If an agent puts a call on hold, that agent will not be marked as available, even though his corresponding BSI went off. Only after the BSI for the corresponding line clears will that agent be marked available.

If, after distributing a call to an agent, the call is not answered, Transfer Callback (standard KSU 11 feature) will automatically be sent to CCU 12 after the number of rings programmed in KSU 11. CCU 12 then recognizes that the call was not answered by that agent, and redistributes the call to the next available agent (The agent will not be marked unavailable, but will fall to the bottom of the distribution list).

If, when a call is answered, no agent is available, the call is put into a hold queue via a "virtual" HOLD button press. If enabled, the Queue Status Message is played to the incoming caller to inform them how many callers are in front of them. For the duration of the time the call is on hold, one of two Refresher Messages is played periodically. CCU 12 alternates between the two messages. In addition, if enabled, the current caller number status is played at the end of the refresher message.

As soon as an agent or (agents) become available, the call is transferred per the selected algorithm as described in the previous section.

All initial configuration programming occurs by dialing CCU 12 intercom extension from another KSU 11 phone set. CCU 12 answers the call by pressing the intercom button and going off-hook. CCU 12 then prompts the caller for the configuration password (the user may change this password). Upon receiving this correctly, CCU 12 leads the user through a series of vocal prompts to accomplish the desired function. CCU 12 hangs up after 3 incorrect password entries. Passwords consist of any 6 dial pad keys, but it is recommended that numbers only be used. The default password is "SETUPQ" or 738870.

If, in configuring CCU 12, the user enters the number of intercoms as greater than zero, a configuration extension prompt is issued. After termination of this configuration session, all configuration programming is done by calling the configuration extension, and not the prime extension associated with CCU 12. That number is now an internal queue line, for distribution of calls transferred into the queue (via an agent, etc.).

The following voice messages are the menus to be played to the user to properly configure CCU 12:

Prompt After Answering:
    "Welcome to QStar. Enter Password."
    Incorrect Password: (Max retries = 3)
    "Incorrect Password. Please Reenter."
    After Correct Password:
    "Press 1 for Configuration, 2 for Recording, 3 for Playback, 4 for Display Setup."
        After Pressing 1:
        "Press 1 for Distribution Method, 2 for Options -continued Setup, 3 for Log In/Log Out Setup, 4 for Night Mode Setup, 5 for Auto attendant Setup."
        After Pressing 1:
        "Enter Distribution Method. Press 1 for Longest Idle, 2 for Preferred."
            After Distribution Method:
            "Enter Number of External Lines. Press pound to terminate."
            Then:
            "Enter Number of Internal Lines. Press pound to terminate."
            Then, if number of internal lines >0:
            "Enter Configuration Extension. Press pound to terminate."
            Then for each agent:
            "Enter Agent Extension followed by star. Press pound terminate."
            If Method = preferred, then for each agent:
            "Enter Agent Type."
        After Pressing 2:
        "Press 1 for message enabling, 2 to set recording speed high, 3 to set recording speed low, 4 to change password, 5 to enable dialing. Press pound to terminate."
            After Pressing 1 for message enabling:
            "Enter message number to toggle on/off."
        After Pressing 3:
        "Enter Log-In Extension. Press pound to terminate."
        Then:
        "Enter Log-Out Extension. Press pound to terminate."
    After Pressing 2:
    "Enter Message Number." (For Recording).
    Then:
    "Begin Message at the Beep. Press pound to terminate."
    After Pressing 3:
    "Enter Message Number. Press pound to terminate."
    (For Playback).

Entering "pound" ("#") at any point will terminate input at that level and jump back to the previous level. In most cases, pressing the Star ("*") will repeat the last menu of choices. Pressing # at the initial menu will terminate the configuration session, and the call is disconnected. Note that this is the only legitimate way to terminate a configuration session—changed parameters may or may not be saved if the call is improperly terminated.

When it is recorded, a user-recorded message is automatically enabled. The administrator may disable or re-enable it via the above procedure. When a message is disabled, it may no longer be played via the Message Playback option. Hence, the enable on/off status of a message may be checked via Message Playback. Message numbers 1 through 5 correspond to the following messages:

1. Welcome Message—the initial message played to all incoming calls.
2. Queued-Call Message—the message played to a caller when first entering the queue when no agents are available.
3. Refresher Message 1—first of the two alternating refresher messages.
4. Refresher Message 2—second of the two alternating refresher messages.
5. Night Mode Message—played to caller when in Night Mode.

Message 9 is the "Caller Number" message. When enabled, it is played upon entry and after each refresher message to keep the caller appraised of his/her position in the queue (Note that since this is not a user recorded message, it cannot be played via the Message Playback option as messages 1 through 4 can).

The recording speed options control 32 kb/s or 24 kb/s recording rates for subsequent user messages. The "LOW" (32 kb/s) speed option provides better fidelity, but shorter messages, while the "HIGH" speed option (24 kb/s) provides slightly lower fidelity, but longer messages. The power on default is "LOW" or 32 kb/s recording.

The "Enable Dialing" portion of the Options menu controls whether a caller is allowed to directly dial a known extension at any voice prompt via DTMF tones. This dialing must consist of either the digit "0" or a full set of extension digits. If the dialing is not completed within 15 seconds, the call is disconnected.

There are several reasons why additional ports might be needed in CCU 12. For one, the capacity of lines and agents could be doubled in applications where needed. A second reason is to reduce the time incoming callers must wait for their calls to be answered if a message is being played on that port. A second port would allow a message to be played on one port while a call is answered, routed or sent a message on the other port.

The line/audio interface cards have a modular design so that additional cards could be added to the CCU 12 motherboard to handle additional ports. A second port can be added by just plugging in a second card. The normal CCU 12 configuration has sufficient processing power to handle two ports.

For cost effectiveness reasons, the present invention uses different types of expansion modules. A card could be equipped with only a set of canned messages, such as "Thank you for calling. All Agents are busy. Please hold.", and with no record capability, which adds a lot of cost to a module. Canned message(s) could then be played periodically to a second incoming call until the call could be distributed or picked up by the first port.

CCU 12 is equipped with an RS-232/RS-485 serial data port for debug use or for driving wall display 14 with queue-type information. CCU 12 accumulates statistical information on how calls are handled, beyond that normally displayed on wall display 14. This information includes: abandoned calls, agent time-in/time-out, number of calls handled, and call length average. CCU 12 transmits this information to PC 15 or to an attached printer, such as printer 19. This call record information could then be post-processed by PC 15.

Additional recording memory capability has been provided for in CCU 12 to allow implementation of an auto-attendant type function. This would allow an incoming caller to direct his call by entering DTMF key presses to a selected department or individual when so directed by CCU 12 voice prompts.

In a preferred embodiment of the present invention, CCU 12 provides expanded record/playback capabilities beyond that provided for in brief messages, while not burdening the current hardware design unnecessarily. A method of expanding the record and playback capabilities is now described.

Figure 8:
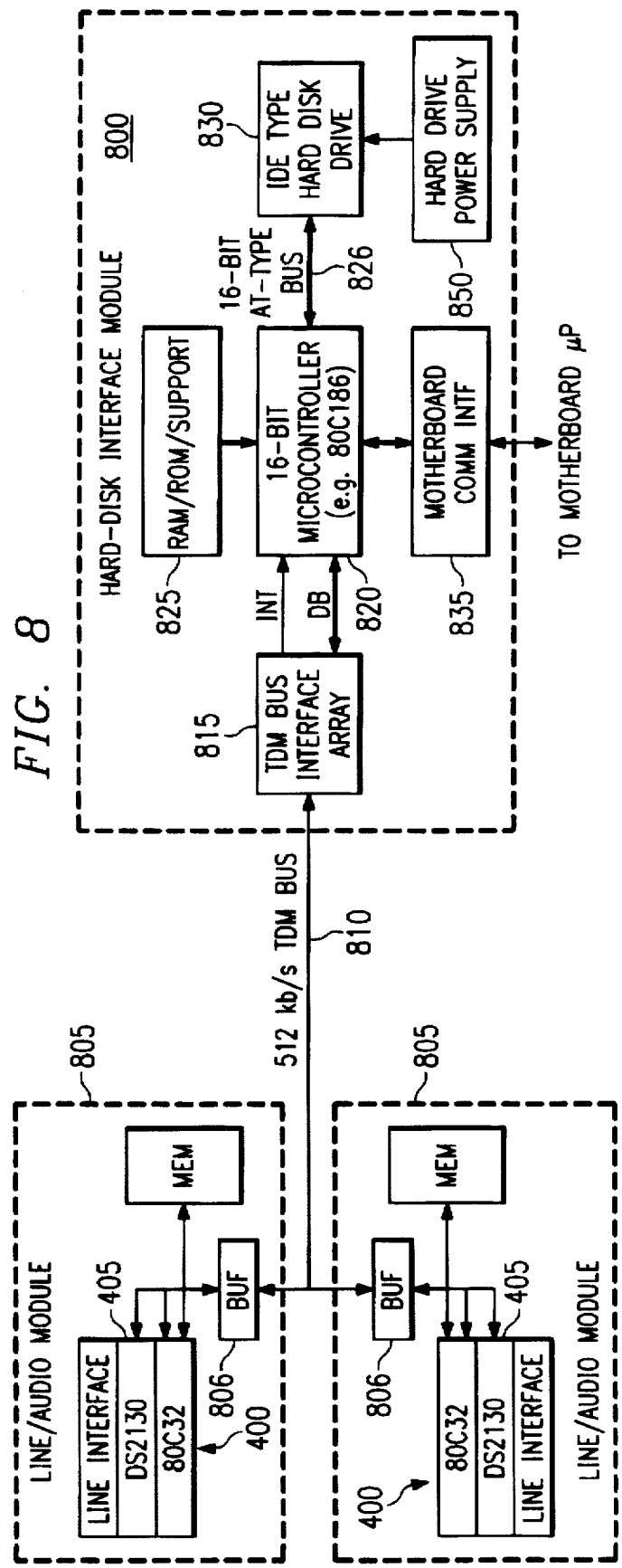
FIG. 8 is a block diagram depicting the interconnection between the line interface and audio modules of the present invention and a hard disc interface module used in an expanded version of the present invention.

The primary storage place for larger amounts of recorded messages is external to the line/audio modules themselves, both to reduce their cost and control the size of such modules. For an application such as voice mail, a hard disk drive is used as shown in FIG. 8. A method to provide access to the compressed audio I/O is needed so that it may be stored in a large capacity, non-volatile device such as a hard disk.

Each Line/audio interface module 805 is equipped with the capability of connecting its compressed audio I/O with an external Time Division Multiplexed (TDM) bus 810 via a tri-state buffer 806 and an open collector driver. This connection is managed under control of the audio microprocessor 400. Bus 810 is intended to take advantage of the capability of VMP 405 to handle data assigned in software programmable time slots. When connected to this bus, all control signals (clock, frame sync) are supplied by an external source rather than by audio microprocessor 400. All line/audio modules 805 may be attached to TDM bus 810 by assigning them to a different 8-bit time slot via software configuration.

TDM Bus 810 is controlled by another expansion module whose function is to handle the time slot assigned compressed audio and store or retrieve it from an attached disk drive 830. This module consists of a TDM bus interface array 815, a 16-bit microcontroller 820, its associated peripherals (RAM/EPROM) 825, an AT-bus interface 826 to an Integrated Device Electronics (IDE) hard disk drive 830, and a signaling interface 835 to microprocessor 31.

When microprocessor 31 determines that a message needs to be recorded or played to/from disk, it sends a message to both the appropriate audio microprocessor 400 and to the hard-disk interface controller 835. Audio microprocessor 400 relinquishes control of the compressed audio bus to hard-disk controller 820 and programs VMP 405 to use an appropriate time slot.

Hard-disk interface controller 820 uses a TDM interface gate array 815 to insert or retrieve time slot data from the TDM bus 810. Array 815 accumulates 8 bits of data from a time slot and then generates an interrupt to controller 820 to tell it to store the data to disk, or in the transmit direction, inserts the next 8 bits to be sent out to TDM bus 810.

Hard-disk interface controller 820 is responsible for all disk I/O functions. Controller 820 has an interface capable of directly driving the disk's IDE bus 826. Controller 820 is responsible for all formatting, directory and related disk functions.

In addition to the hard-disk interface card, an additional power supply 850 is required to supply the hard disk 830. This is typically a small switching supply capable of meeting the drives' voltage and current capabilities. Power supply 850 also supplies the +5 VDC needed to run CCU 12, rather than the internal regulator/wall board method used in a non-disk application.

Once disk-drive recording capability is added, CCU 12 firmware supports applications that require such large message capabilities as voice mail. With the distributed processing architecture present in CCU 12, these functions are implemented with relatively high-level commands from microprocessor 31, with the expansion modules handling most of the work.

Although the present invention and its advantages have been described in detail, it should be understood that various changes, substitutions and alterations can be made herein without departing from the spirit and scope of the invention as defined by the appended claims.

What is claimed is:

1. A telephone switch control apparatus for providing automatic call distribution capability for telephone calls incoming to a key service unit coupled to a plurality of digital telephones, said incoming calls connectable to ones of said plurality of digital telephones, but not specifically directed to a particular digital telephone of said plurality of digital telephones, said telephone switch control apparatus comprising:

a digital line interface;

means for coupling said digital line interface to said key service unit;

means, including a first processor, operable for transmitting digital data to and receiving digital data from said key service unit via said digital line interface, wherein said digital data received from said key service unit indicates the busy/idle status of each one of said plurality of digital telephones and wherein said digital data transmitted to said key service unit comprises a transfer command operable to cause said key service unit to transfer an incoming call to a selected one of said plurality of digital telephones according to a user-defined algorithm processed by said first processor;

an electronic memory coupled to said first processor and independent from said key service unit, wherein said electronic memory contains said user-defined algorithm;

means controlled by said first processor for storing said received busy/idle status data in said electronic memory;

means including a second processor coupled to said first processor for generating a plurality of digital audio messages in response to commands from said first processor, wherein said digital audio messages are transmitted to said incoming call via said digital line interface.

2. The telephone switch control apparatus as set forth in claim 1 further comprising:

means controlled by said first processor, under control of said user-defined algorithm, for generating said transfer command depending on the busy/idle status of at least one digital telephone of the plurality of digital telephones.

3. The telephone switch control apparatus as set forth in claim 1 wherein said telephone switch control apparatus is a special purpose device and is coupled to a personal computer, said personal computer operable to receive the busy/idle status of said digital telephones from said electronic memory under control of said first processor and to calculate statistical call records pertaining to the activity of each digital telephone of said plurality of digital telephones and display the results on a monitor attached to said personal computer.

4. The telephone switch control apparatus as set forth in claim 2 wherein said telephone switch control apparatus is coupled to a printer.

5. The telephone switch control apparatus as set forth in claim 1 wherein said telephone switch control apparatus further includes:

means for placing said incoming call on hold and wherein said second processor includes:
means for transmitting a select one of said plurality of digital audio messages to said incoming call whenever said busy/idle status of said plurality of digital telephones indicates that all of said plurality of digital telephones are busy.

6. The telephone switch control apparatus as set forth in claim 1 wherein said user-defined algorithm includes:

means for causing said incoming call to be transferred to a least-used digital telephone of said plurality of digital telephones.

7. The telephone switch control apparatus as set forth in claim 1 wherein said user-defined algorithm includes:

means for causing said incoming call to be transferred to a most-preferred digital telephone of said plurality of digital telephones, said most-preferred digital telephone selected from a list of preferred ones of said plurality of digital telephones identifying a plurality of groups of digital telephones.

8. The telephone switch control apparatus as set forth in claim 1 wherein said first processor is operable under control of said user-defined algorithm for calculating and storing data in said electronic memory, said calculated and stored data comprising statistical call records pertaining to the activity of each digital telephone of said plurality of digital telephones.

9. The telephone switch control apparatus as set forth in claim 1 wherein said user-defined algorithm causes said incoming call to be transferred to a least-used digital telephone of said plurality of digital telephones.

10. The telephone switch control apparatus as set forth in claim 1 wherein said user-defined algorithm causes said incoming call to be transferred to a most-preferred digital telephone of said plurality of digital telephones, said most-preferred digital telephone selected from a list of preferred ones of said plurality of digital telephones identifying a plurality of groups of digital telephones.

11. The telephone switch control apparatus as set forth in claim 1 wherein said busy/idle status data is stored in said electronic memory and wherein said first processor is coupled to a display screen for displaying the busy/idle status of said plurality of digital telephones obtained from said electronic memory.

12. The telephone switch control apparatus set forth in claim 1 wherein said key service unit is disposed between said switch control apparatus and all central office switches operable in completing said incoming call.

13. The telephone switch control apparatus set forth in claim 6 wherein said first processor is operable under control of said user-defined algorithm to maintain a timer of each digital telephone of said plurality of digital telephones, said timer being utilized to determine said least used digital telephone.

14. The telephone switch control apparatus set forth in claim 7 wherein said electronic memory contains a hierarchy of preference of ones of said groups of digital telephones, said hierarchy being utilized to determine said most preferred digital telephone.

15. The telephone switch control apparatus set forth in claim 1 wherein ones of said plurality of digital telephones include means for placing a current call on hold, said switch control apparatus further comprising:

means for identifying ones of said plurality of digital telephones having placed a current call on hold; and means operable with said identifying means for not transferring an incoming call to a particular digital telephone of said plurality of digital telephones when said particular digital telephone has a current call placed on hold.

16. The telephone switch control apparatus set forth in claim 1 further comprising:

means for programming the first processor by a user to automatically distribute telephone calls according to said user defined algorithm, wherein said user defined algorithm is at least in part selected from a plurality of different call distribution techniques stored in said electronic memory, said programming means including a digital telephone of said plurality of digital telephones coupled to said telephone switch to allow said user to interface with said first processor for programming.

17. A telephone switch control apparatus for providing automatic call distribution and auto-attendant capability to a digital telephone switch, wherein said telephone switch is coupled to a plurality of digital telephones and wherein said telephone switch is operable for connecting an incoming call to said switch control apparatus and for transmitting line appearance data of at least one of said plurality of digital telephones to said switch control apparatus, said switch control apparatus comprising:

an electronic memory;

means at least in part stored in said electronic memory for selectable controlling said automatic call distribution and auto-attendant capability, said controlling means including a plurality of different call distribution techniques selectable by a user of said control apparatus said controlling means also including a user selectable auto-attendant function wherein a caller may autonomously direct the call;

means for storing in said electronic memory an instruction set for controlling telephone connections in said telephone switch;

means coupled to at least one digital line interface of said telephone switch and operable for receiving incoming call data from said telephone switch, said incoming call data including line appearance data;

means for processing said received incoming call data under control of said stored instruction set; and means for transmitting digital data to said telephone switch, wherein said transmitted digital data includes a transfer command operable to cause said telephone switch operating under an internally controlled instruction set to transfer said incoming call to a selected one of said plurality of digital telephones, wherein said transfer of said incoming call by said telephone switch is accomplished without a change of condition at a central office switch, and wherein said transmitted digital data further includes a first hold command operable to place said incoming call in a hold condition and a second hold command operable to remove said incoming call from said hold condition.

18. The telephone switch control apparatus as set forth in claim 17 wherein said switch control apparatus further includes:

memory means operable to store a plurality of digital audio messages; and means operable to transmit a selected one of said stored digital audio messages to said incoming call on said digital line interface under control of said stored instruction set.

19. The telephone switch control apparatus as set forth in claim 18 wherein said transfer command causes said telephone switch to transfer said incoming call to said selected one of said plurality of digital telephones when said line appearance data indicates said selected one of said plurality of digital telephones is idle.

20. The telephone switch control apparatus as set forth in claim 17 wherein said stored instruction set includes instructions for generating said transfer command according to a user-defined algorithm.

21. The telephone switch control apparatus as set forth in claim 17 wherein said processing means calculates and stores data in said electronic memory, said calculated and stored data comprising statistical call records pertaining to the activity of each one of said plurality of digital telephones.

22. The telephone switch control apparatus as set forth in claim 20 wherein said user-defined algorithm causes said incoming call to be transferred to a least-used one of said digital telephones.

23. The telephone switch control apparatus as set forth in claim 20 wherein said user-defined algorithm causes said incoming call to be transferred to a most-preferred one of said digital telephones selected from a list of preferred ones of said digital telephones identifying a plurality of groups of digital telephones.

24. The telephone switch control apparatus as set forth in claim 17 wherein said processing means is coupled to a display screen, wherein said display screen is used to display said line appearance data of said plurality of digital telephones.

25. The telephone switch control apparatus as set forth in claim 17 wherein said switch control apparatus is coupled to a personal computer, said personal computer operable to receive said line appearance data of said plurality of digital telephones from said processing means and to calculate statistical call data records pertaining to the activity of each digital telephone of said plurality of digital telephones and display the results on a monitor attached to said personal computer.

26. The telephone switch control apparatus as set forth in claim 17 wherein said switch control apparatus is coupled to a printer.

27. The telephone switch control apparatus as set forth in claim 17 wherein said electronic memory includes a disk drive.

28. The telephone switch control apparatus as set forth in claim 18 wherein said means for transmitting said stored digital audio messages transmits a select one of said plurality of digital audio messages to said incoming call and said switch control apparatus transmits said first hold command to said telephone switch whenever said line appearance data from said telephone switch indicates all digital telephones of said plurality of digital telephones are busy.

29. The telephone switch control apparatus as set forth in claim 18 wherein said switch control apparatus transmits said second hold command to said telephone switch and said means for transmitting said stored digital audio messages transmits a select one of said plurality of digital audio messages to said incoming call.

30. A method for providing automatic call distribution capability for telephone calls coming into a telephone switch coupled to a plurality of digital telephones, the incoming calls connectable to any digital telephone of said plurality of digital telephones, but not specifically directed to a particular digital telephone of said plurality of digital telephones, the method comprising the steps of:

programming the telephone switch to send the incoming calls to a selected digital line interface coupled to said telephone switch;

coupling a digital processor to the selected digital line interface of the telephone switch, the telephone switch being interposed between said digital processor and any central office switch through which said incoming calls may be routed, the digital processor operable for transmitting digital data to and receiving digital data from the telephone switch via the digital line interface, wherein the digital data received from the telephone switch includes the busy/idle status of each one of the plurality of digital telephones and wherein the digital data transmitted to the telephone switch comprises a transfer command operable to cause the telephone switch to transfer an incoming phone call to a selected one of the plurality of digital telephones;

programming the digital processor to automatically distribute telephone calls according to a user defined algorithm stored in an electronic memory coupled to the digital processor, wherein said user defined algorithm is at least in part selected from a plurality of different call distribution techniques stored in said electronic memory said programming step utilizing a digital telephone of said plurality of digital telephones coupled to said telephone switch to allow a user to interface with said digital processor for programming;

storing the received busy/idle status data in the electronic memory;

receiving the incoming phone call sent by the telephone switch on the digital line interface;

transmitting a digital audio message of a plurality of digital audio messages through said digital line interface to said incoming phone call;

transmitting the transfer command to the telephone switch according to said user-defined algorithm.

31. The method as set forth in claim 30 wherein the digital processor transmits the transfer command to the telephone switch based upon the busy/idle status of the plurality of digital telephones.

32. The method as set forth in claim 30 wherein the user-defined algorithm causes the incoming phone call to be transferred to a least-used digital telephone of the plurality of digital telephones.

33. The method as set forth in claim 30 wherein the user-defined algorithm causes the incoming phone call to be transferred to a most-preferred digital telephone of the plurality of digital telephones selected from a list of preferred digital telephones of said plurality of digital telephones identifying a plurality of groups of digital telephones.

34. The method as set forth in claim 30 and including the further step of displaying the busy/idle status of the plurality of digital telephones on a monitor of a personal computer coupled to the digital processor.

35. The method set forth in claim 30 and including the further steps of calculating and storing data in the electronic memory, the calculated and stored data comprising statistical call records pertaining to the activity of each one of said plurality of digital telephones.

36. The method as set forth in claim 30 and including the further steps of transmitting a hold command to the telephone switch when the incoming phone call is received on the digital interface line and the busy/idle status indicates that all of the plurality of digital telephones are busy.

37. The method as set forth in claim 36 and including the further step of transmitting a release command to the telephone switch when the busy/idle status changes to indicate that at least one digital telephone of the plurality of digital telephones is idle.

* * * * *